(12) United States Patent
Calis et al.

(10) Patent No.: US 8,741,993 B2
(45) Date of Patent: Jun. 3, 2014

(54) POLYOLEFIN MEMBER AND METHOD OF MANUFACTURING

(75) Inventors: Gijsbertus Hendrikus Maria Calis, Hulsberg (NL); Hendrik Derk Hoving, Susteren (NL); Elisabeth Mueller, Berlin (DE)

(73) Assignee: DSM IP Assets B.V., Heerlen (NL)

( * ) Notice: Subject to any disclaimer, the term of this patent is extended or adjusted under 35 U.S.C. 154(b) by 167 days.

(21) Appl. No.: 13/377,960

(22) PCT Filed: Jul. 26, 2010

(86) PCT No.: PCT/EP2010/060805
§ 371 (c)(1),
(2), (4) Date: Feb. 28, 2012

(87) PCT Pub. No.: WO2011/012578
PCT Pub. Date: Feb. 3, 2011

(65) Prior Publication Data
US 2012/0142834 A1     Jun. 7, 2012

(30) Foreign Application Priority Data
Jul. 27, 2009  (EP) .................................... 09166500

(51) Int. Cl.
*C08K 5/42* (2006.01)
*B29C 47/00* (2006.01)

(52) U.S. Cl.
USPC ........................ 524/160; 524/158; 264/178 R

(58) Field of Classification Search
USPC .............................. 524/158, 160; 264/178 R
See application file for complete search history.

(56) References Cited

U.S. PATENT DOCUMENTS 4,411,854 A    10/1983  Maurer et al.

FOREIGN PATENT DOCUMENTS

EP           0 419 060       3/1991
WO       WO 2005/066401      7/2005

OTHER PUBLICATIONS

International Search Report for PCT/EP2010/060805, mailed Oct. 14, 2010.

*Primary Examiner* — John Uselding
(74) *Attorney, Agent, or Firm* — Nixon & Vanderhye P.C.

(57) ABSTRACT

The invention concerns an improved process for producing high performance polyolefin member. The process comprises the steps of preparing a solution comprising a polyolefin and a solvent, extruding or spinning the solution into an air gap to form a fluid member, cooling the fluid member to form a solvent-containing gel member, and removing at least partly the solvent from the gel member to form a solid member before, during and/or after drawing the member. Furthermore, the process involves the presence of an antifoaming agent comprising an aryl sulphonic acid or an alkyl naphtyl sulphonic acid. The invention further concerns the geltruded polyolefin member comprising aryl sulphonic acid or alkyl naphtyl sulphonic acid.

20 Claims, No Drawings

POLYOLEFIN MEMBER AND METHOD OF MANUFACTURING

This application is the U.S. national phase of International Application No. PCT/EP2010/060805, filed 26 Jul. 2010, which designated the U.S. and claims priority to EP Application No. 09166500.0, filed 27 Jul. 2009, the entire contents of each of which are hereby incorporated by reference.

TECHNICAL FIELD OF THE INVENTION

The invention relates to manufacturing of polyolefin members, such as fibre, tape and sheet members comprising polyolefin material. More particularly, the invention relates to geltrusion of such members. Furthermore, the invention relates to a method of manufacturing of such members.

BACKGROUND OF THE INVENTION

Polyolefin members may be prepared by extrusion of a solution of polyolefin in a solvent followed by stretching. This process is referred to as the geltrusion processes, and leads to high strength fibrous materials, such as fibre, tape and sheet members. Geltrusion is fundamentally different from the other main processes for manufacturing high performance polyolefin fibres, such as melt spinning and solid formation. The geltrusion process for manufacturing of fibres is for example disclosed in EP 1 699 954 and for manufacturing of sheet members is for example disclosed in EP 0 500 173 and EP 0 504 954.

OBJECTS OF THE INVENTION

It is the object of the invention to provide an improved polyolefin member.
It is another object of the invention to provide an improved method of manufacturing a polyolefin member.
The improvement may for example be increased reproducibility and/or improved quality of the members or the process of manufacture.

DISCLOSURE OF THE INVENTION

One or more of the above and/or other objects of the invention are realised by a process for producing a polyolefin member, which process comprises preparing a solution comprising polyolefin and a solvent, and extruding or spinning the solution into an air gap to form a fluid member. The fluid member is thereafter cooled to form a solvent-containing gel member to form a solid member. The member is further drawn before, during and/or after at least partially removing the solvent from the member. The cooling involves transferring the fluid member to a cooling bath. In the first embodiment of the invention, the cooling bath comprises an organic phase and a water based phase, and an antifoaming agent comprising an aryl sulphonic acid, preferably the antifoaming agent comprises alkyl benzene sulphonic acid or alkyl naphtyl sulphonic acid, such as for example dinonylnaphthyl sulphonic acid or dodecylbenzene sulphonic acid.

Surprisingly it was found that the addition of such an antifoaming agent improved the quality of the produced members. For example, addition of aryl sulphonic acid reduced the number of surface defects of polymeric sheet members. The use of an antifoaming agent comprising alkyl benzene sulphonic acid and/or alkyl naphtyl sulphonic acid was found to be effective, and it may be speculated without being limited thereto, that the combination of a smaller aromatic fraction with an alkyl fraction provides a suitable balance to the highly hydrophilic sulphonic group. Particularly preferred examples from this group are an antifoaming agent comprising dinonylnaphthyl sulphonic acid and/or dodecylbenzene sulphonic acid, as these are commercially available for example in Stadis®, such as Stadis® 450, and Statsafe®, such as Statsafe® 6000, products of Innospec Inc. Of these, dodecylbenzene sulphonic acid as in Statsafe® 6000 is preferred as it is more acceptable from an environmental point of view as most of the solvent is heptane and does not require large amounts of benzene or toluene for preparation of a stable commercial solution.

The antifoaming agent may comprise one or more further components. For example, the antifoaming agent may comprise further active components, such as antifoaming reagents (for example a combination of dodecylbenzene sulphonic acid with another alkyl benzene sulphonic acid or another type of antifoaming agent), surfactants, solvents, suspension aids, antifouling agents etc.)

The cooling bath is preferably a two phase cooling bath, having a primarily water based phase and an organic phase. The antifoaming agent should be added in an active amount. Typically, the active amount is more than about 3 ppm. In other words more than about 3 mg antifoaming agent comprising at least one of the above mentioned chemical compounds per kg cooling fluid (the sum of water based phase and organic based phase). In a preferred embodiment, the antifoaming agent is added to a concentration in the cooling bath of between 4 ppm to 20 ppm based on masses. This concentration is suitable in most cases for polyolefin. For manufacturing of high performance polyethylene and polypropylene fibre based members, it is preferred to utilize a concentration of the antifoaming agent in the cooling bath of between 5 ppm to 15 ppm, as this allows for realizing the required antifoaming effect while limiting the contamination of the produced members and recycled organic material (solvent and/or cooling fluid) to an acceptable level.

The cooling bath may also be a one phase cooling bath, in which case a water phase is preferred due to the high heat capacity and heat conduction of water. Antifoaming agent may also in this case be added to prevent formation of foam or droplets of solvent on the surface of the cooling bath.

The concentration of the antifoaming agent may be difficult to determine after the addition and particularly, if the process is conducted in a process environment utilizing recycling of one or more components of the process, such as the polyolefin or the solvent and/or the organic phase of the cooling bath. It will hence be appreciated that the inventors also defined the active amount as the conductivity of the organic phase of the cooling bath. It was found that the active amount lead to a conductivity of at least 800 pS/m [pico Siemens per meter]. The conductivity is measured as described in the experimental part. In a preferred embodiment, the conductivity of the organic phase is 1000 pS/m to 3000 pS/m. This conductivity is suitable in most cases for polyolefin. For manufacturing of high performance polyethylene and polypropylene fibre based members, it is preferred to adjust the conductivity of the organic phase in the cooling bath to 1500 pS/m to 2500 pS/m, and most preferably the conductivity of the organic phase is 2000 pS/m to 2300 pS/m as this allows for realizing the required antifoaming effect while limiting the contamination of the produced members and recycled organic material (solvent and/or cooling fluid) to an acceptable level.

After extrusion, solvent is at least partially removed from the polyolefin member. This may be conducted before, during and/or after drawing of the polyolefin member. The solvent may for example be removed at least partially by evaporation or extrusion.

The member is drawn to align the fibrils of the polyolefin, whereby the properties, such as strength and Young's modulus, are improved. The stretching may be conducted in one or more stages and continuous or in a batch process. It is preferred to utilize several stretching stages in a continuous process, as this allows for a more cost efficient process.

The drawing ratio depends on the shape and the intended application of the polyolefin member. Typically, the polyolefin member is drawn by a factor of at least 2 in the machine direction. To further enhance the alignment of the fibrils in the machine direction, it is preferably to draw the polyolefin member by a factor of at least 10 in the machine direction. Particularly for thin band shaped members and fibers, it is preferred that the polyolefin member is drawn by a factor of at least 100 in the machine direction, and for fiber polyolefin members high drawing ratios, such as for example a factor of 1000 to 5000, was found to be highly advantageous leading to very high specific fiber strengths. In another embodiment, the polyolefin member is a sheet member and the polyolefin member is drawn biaxially by an area factor of at least 8. If for example very high strength is required it was found to be advantageous that the polyolefin member is drawn biaxially by an area factor of at least 25, such as for example a factor of 6.25 in the machine direction combined with a factor of 4 in the transverse direction. In principle the sheet may also be drawn in other directions (such as 45° to the machine direction), however, this is not a preferred embodiment. A high stretching ratio like for example an area factor of 15-50 is advantageous in allowing for high specific strength with a high open porosity of for example 70-95%.

In a particularly preferred embodiment, the solution prepared from polyolefin and solvent further comprises an antifoaming agent selected from the group consisting of aryl sulphonic acids. This allows for including the advantages of the second aspect of the invention into the first aspect of the invention. In a highly preferred embodiment, the antifoaming agent comprised in the solution is the same (combination) as the antifoaming agent comprised in the cooling bath. In this way, at least a part of the antifoaming agent may be provided to the cooling bath via the geltruded member. This may for example be an advantage when the solvent used in the solution is recycled as it reduces the amount of waste produced as well as reduces the cleaning requirements of the solvent prior to recycling.

In another embodiment of the invention, one or more of the above and/or other objects of the invention are realized by a process for producing a polyolefin member, wherein the solution further comprises an antifoaming agent comprises an aryl sulphonic acid, the antifoaming agent comprises alkyl benzene sulphonic acid and alkyl naphtyl sulphonic acid, such as for example dinonylnaphthyl sulphonic acid or dodecylbenzene sulphonic acid. The addition of one or more of the above mentioned antifoaming agents prevents or reduces the formation of foam during the formation of the solution as well as enhances the formation of a stable solution. This leads to improved processability and in some cases improved products due to reduced concentration of (surface) defects, for example caused by presence of unsolved polyolefin particles.

It is preferred that the antifoaming agent is added in an amount to adjust the conductivity of the solution to at least 800 pS/m. More preferably, the antifoaming agent is added in an amount to adjust the conductivity of the solution to between 1000 pS/m to 3000 pS/m. This conductivity is suitable in most cases for polyolefin. For manufacturing of high performance polyethylene fibre based members, it is preferred that the antifoaming agent is added to adjust the conductivity of the solution to 1500 pS/m to 2500 pS/m, and most preferably the antifoaming agent is added to adjust the conductivity of the solution to 2000 pS/m to 2300 pS/m.

It is highly preferred that the cooling bath is of the type as described under the first aspect of the invention having two phases and preferably comprising an antifoaming agent as described in the first aspect of the invention. The member produced according to the second aspect of the invention should also be drawn and the same preferred embodiments apply to the second aspect of the invention as to the first aspect of the invention.

A further aspect of the invention concerns the use of an antifoaming agent in the manufacturing of a polyolefin member, wherein the antifoaming agent comprises an aryl sulphonic acid, preferably the antifoaming agent comprises alkyl benzene sulphonic acid or alkyl naphtyl sulphonic acid, such as for example dinonylnaphthyl sulphonic acid or dodecylbenzene sulphonic acid. The use may for example be as described in the first and the second aspect of the invention. The inventors found that this type of antifoaming agent is particularly advantageous in the manufacture of polyethylene members based on polyethylene and particularly UHMwPE, since UHMwPE is particularly difficult to process due to the tendency to form high viscosity solutions.

The invention also concerns a geltruded polyolefin member comprising between 0.01 ppm to 100 ppm aryl sulphonic acid. Preferably the member comprises alkyl benzene sulphonic acid or alkyl naphtyl sulphonic acid, such as for example dinonylnaphthyl sulphonic acid or dodecylbenzene sulphonic acid. In a preferred embodiment, the geltruded polyolefin member comprises stretched UHMwPE fibers with an IV of more than 5 dl/g, as this provides a member having very good mechanical properties, such as a high tensile strength, modulus, and energy absorption at break. More preferably, a polyethylene with an IV of more than 10 dl/g is chosen. This is because a yarn made by gel-spinning such UHMwPE yarn offers a combination of high strength, low relative density, good hydrolysis resistance, and excellent wear properties. Suitable UHMwPE has an intrinsic viscosity of typically at least 5 dl/g, preferably between about 8 and 40 dl/g, more preferably between 10 and 30, or 12 and 28, or between 15 and 25 dl/g.

Gel spinning of UHMwPE has been described in various publications, including EP 0205960 A, EP 0213208A1, U.S. Pat. No. 4,413,110, WO 01/73173 A1, and Advanced Fiber Spinning Technology, Ed. T. Nakajima, Woodhead Publ. Ltd (1994), ISBN 1-855-73182-7, and references cited therein. These publications are incorporated herein by reference. Therefore, according to one aspect of the present invention, the fluid composition is a solution of UHMwPE in a solvent and the process comprises the step of at least partly removing the solvent.

In the process, any of the known solvents for gel spinning of UHMwPE can be used. Suitable examples of spinning solvents include aliphatic and alicyclic hydrocarbons, e.g. octane, nonane, decane and paraffins, including isomers thereof; petroleum fractions; mineral oil; kerosene; aromatic hydrocarbons, e.g. toluene, xylene, and naphthalene, including hydrogenated derivatives thereof, e.g. decaline and tetralin; halogenated hydrocarbons, e.g. monochlorobenzene; and cycloalkanes or cycloalkenes, e.g. careen, fluorine, camphene, menthane, dipentene, naphthalene, acenaphtalene, methylcyclopentadiene, tricyclodecane, 1,2,4,5-tetramethyl-1,4-cyclohexadiene, fluorenone, naphtindane, tetramethyl-p-benzodiquinone, ethylfluorene, fluoranthene and naphthenone. Also combinations of the above-enumerated spinning solvents may be used for gel spinning of UHMwPE, the combination of solvents being also referred to for simplicity as spinning solvent. In one embodiment, the spinning solvent of choice has a low vapor pressure at room temperature, e.g. paraffin oil. It was also found that the process of the invention is especially advantageous for relatively volatile spinning solvents at room temperature, as for example decaline, tetraline and kerosene grades. Most preferably, the spinning solvent is decaline.

A gel-spun longitudinally drawn UHMwPE tape has a very high tenacity. Preferably, the UHMwPE tape has a tenacity of at least 20 cN/dtex, preferably at least 25 cN/dtex, even more preferably at least 30 cN/dtex, most preferably at least 35 cN/dtex. Such a high tenacity is obtainable due to the fact that the tape is a drawn UHMwPE tape.

Furthermore, the gel-spun longitudinally drawn UHMwPE tape has a very high modulus. Preferably, the tape has a modulus of at least 600 cN/dtex, more preferably at least 900 cN/dtex, even more preferably at least 1300 cN/dtex.

Polyolefin may be polyethylene, polypropylene, or any other suitable polymer which can be geltruded according to the process. In a preferred embodiment, the polyolefin is a high molecular weight polyethylene (HMwPE) or an ultra high molecular weight polyethylene (UHMwPE). By a HMwPE or UHMwPE is meant a tape which comprises HMwPE or UHMwPE at 75 wt % of the total weight of the final dried member. The ratio is preferably at least 90 wt %, and most preferably at 100 wt %. When the member is made from a combination of HMwPE and UHMwPE, the resultant member may be a HMwPE tape or a UHMwPE tape, depending on the ratio of the HMwPE and the UHMwPE.

By high molecular weight polyethylene (HMwPE), it is herein meant a polyethylene with a molecular weight from 50,000 to 400,000. Ultrahigh molecular weight polyethylene (UHMwPE) is defined herein as a polyethylene with a molecular weight of at least 400,000. UHMwPE may have a molecular weight of up to several millions. Unless otherwise stated, the molecular weight referred herein is a weight average molecular weight (Mw).

Intrinsic viscosity may be used for determining the molecular weight. Intrinsic viscosity is a measure for molar mass (also called molecular weight) that can more easily be determined than actual molar mass parameters such as Mn and Mw. The IV is determined according to method PTC-179 (Hercules Inc. Rev. Apr. 29, 1982) at 135° C. in decaline, the dissolution time being 16 hours, with DBPC as the antioxidant in an amount of 2 g/l solution, and the viscosity at different concentrations is extrapolated to zero concentration. There are several empirical relations between IV and Mw, but such relation is highly dependent on molar mass distribution. Based on the equation $Mw=5.37*10^4 [IV]^{1.37}$ (see EP 0504954 A1) an IV of 4.5 dl/g would be equivalent to a Mw of about $4.2 \times 10^5$ g/mol.

Because of their long molecule chains, stretched UHMwPE fibers with an IV of more than 5 dl/g have very good mechanical properties, such as a high tensile strength, modulus, and energy absorption at break. More preferably, a polyethylene with an IV of more than 10 dl/g is chosen. This is because a yarn made by gel-spinning such UHMwPE yarn offers a combination of high strength, low relative density, good hydrolysis resistance, and excellent wear properties. Suitable UHMwPE has an intrinsic viscosity of typically at least 5 dl/g, preferably between about 8 and 40 dl/g, more preferably between 10 and 30, or 12 and 28, or between 15 and 25 dl/g.

Preferably, the HMwPE and UHMwPE of the present invention are a linear polyethylene, i.e. a polyethylene with less than one side chain or branch per 100 carbon atoms, and preferably less than one side chain per 300 carbon atoms, a branch generally containing at least 10 carbon atoms. Preferably, only polyethylene is present, but alternatively the polyethylene may further contain up to 5 mol % of alkenes that may or may not be copolymerized with it, such as propylene, butene, pentene, 4-methylpentene or octene. The polyethylene may further contain additives that are customary for such fibres, such as anti-oxidants, thermal stabilizers, colorants, etc., up to 15 weight %, preferably 1-10 weight %.

EXAMPLES

Conductivity: The conductivity of the organic phase of the cooling bath is measured by an EMCEE Electronics Model 1152 Digital Conductivity Meter at 20° C.

IV: The Intrinsic Viscosity is determined according to method PTC-179 (Hercules Inc. Rev. Apr. 29, 1982) at 135° C. in decaline, the dissolution time being 16 hours, with DBPC as anti-oxidant in an amount of 2 g/l solution, by extrapolating the viscosity as measured at different concentrations to zero concentration;

Side chains: The number of side chains in a UHMwPE sample is determined by FTIR on a 2 mm thick compression moulded film, by quantifying the absorption at 1375 $cm^{-1}$ using a calibration curve based on NMR measurements (as in e.g. EP 0269151);

Example 1

Preparation of UHMwPE Fibre Material

UHMwPE powder and antifoaming agent was mixed in a solvent (decaline) to yield a final concentration of about 10% UHMwPE to form a solution. Thereafter the solution was extruded using a twin blade extruder to yield a fluid member, which was cooled and stretched to form the solid member. The method is further described in WO2005/066401.

The behaviour of the solution and foaming in the cooling bath was observed.

| Antifoaming agent | Concentration in solution | Observations Solution container | Observations Cooling bath |
|---|---|---|---|
| No antifoaming agent | 0 | Solution sticking to side of container | Foam is observed |
| Stadis 450* | 8 ppm | Very limited sticking | No foam observed |
| Statsafe 6000** | 1 ppm | Some sticking | Some foam observed |
| Statsafe 6000** | 8 ppm | Very limited sticking | No foam observed |
| Statsafe 6000** | 16 ppm | Very limited sticking | Small amount of foam observed |

*Stadis 450 comprises 10-30% Dinonylnaphthyl sulphonic acid
**Statsafe 6000 comprises 5-10% Dodecylbenzene sulphonic acid An individual feature or combination of features from an embodiment of the invention described herein, as well as obvious variations thereof, are combinable with or exchangeable for features of the other embodiments described herein, unless the person skilled in the art would immediately realize that the resulting embodiment is not physically feasible.

The invention claimed is:

1. A process for producing a polyolefin member comprising the steps of:
   (a) preparing a solution comprising polyolefin, a solvent, and an antifoaming agent comprising an aryl sulphonic acid,
   (b) extruding or spinning the solution into an air gap to form a fluid member,
   (c) cooling the fluid member to form a solvent-containing gel member,
   (d) drawing the member, and
   (e) removing at least partly the solvent from the gel member to form a solid member before, during and/or after drawing the member.

2. The process according to claim 1, wherein step (c) comprises transferring the fluid member to a cooling bath, wherein the cooling bath comprises the antifoaming agent comprising an aryl sulphonic acid.

3. The process according to claim 1, wherein the polyolefin member is drawn according to step (d) in a machine direction by a factor of at least 3.

4. The process according to claim 1, wherein the polyolefin member is a sheet member, and wherein step (d) comprises biaxially drawing the polyolefin sheet member by an area factor of at least 10.

5. A process for producing a polyolefin member comprising the steps of:
   (a) preparing a solution comprising a polyolefin and a solvent,
   (b) extruding or spinning the solution into an air gap to form a fluid member,
   (c) cooling the fluid member to form a solvent-containing gel member,
   (d) drawing the member, and
   (e) removing at least partly the solvent from the gel member to form a solid member before, during and/or after drawing the member, wherein
   the cooling step (c) comprises transferring the fluid member to a cooling bath comprising an organic phase and a water based phase, and wherein
   the cooling bath comprises an antifoaming agent comprising an aryl sulphonic acid.

6. The process according to claim 5, wherein the antifoaming agent in the cooling bath is present at a concentration between 4 ppm to 20 ppm.

7. The process according to claim 5, wherein the organic phase of the cooling bath has a conductivity of 1000 pS/m to 3000 pS/m.

8. The process according to claim 5, wherein step (d) comprises drawing the polyolefin member in a machine direction a factor of at least 2.

9. The process according to claim 5, wherein the polyolefin member is a sheet member, and wherein step (d) comprises biaxially drawing the polyolefin sheet member by an area factor of at least 8.

10. The process according to claim 5, wherein the solution comprises the antifoaming agent comprising an aryl sulphonic acid.

11. The process according to claim 1, wherein the aryl sulphonic acid is an alkyl benzene sulphonic acid or alkyl naphtyl sulphonic acid.

12. The process according to claim 11, wherein the aryl sulphonic acid is dinonylnaphthyl sulphonic acid or dodecylbenzene sulphonic acid.

13. The process according to claim 2, wherein the cooling bath is a two phase cooling bath having an organic phase and a water based phase.

14. The process according to claim 3, wherein the polyolefin member is drawn in the machine direction by a factor of at least 10.

15. The process according to claim 4, wherein the polyolefin sheet member is biaxially drawn by an area factor of at least 25.

16. The process according to claim 1, wherein the polyolefin is an ultrahigh molecular weight polyethylene having an intrinsic viscosity of at least 5 dl/g.

17. A geltruded polyolefin member comprising between 0.01 ppm to 100 ppm aryl sulphonic acid.

18. The geltruded polyolefin member according to claim 17, wherein the aryl sulphonic acid is alkyl benzene sulphonic acid or alkyl naphtyl sulphonic acid.

19. The geltruded polyolefin member according to claim 17, wherein the member is in a form of a fiber, tape or sheet.

20. The geltruded polyolefin member according to claim 17, wherein the polyolefin is an ultrahigh molecular weight polyethylene having an intrinsic viscosity of at least 5 dl/g.

* * * * *